Sept. 15, 1970    D. P. OOSTHOEK ET AL    3,529,161
SEMICONDUCTOR DEVICE FOR DETECTING AND/OR MEASURING RADIATION
Filed Feb. 28, 1967    4 Sheets-Sheet 1

INVENTORS
DIRK PIETER OOSTHOEK
ERWIN KOK
BY

AGENT

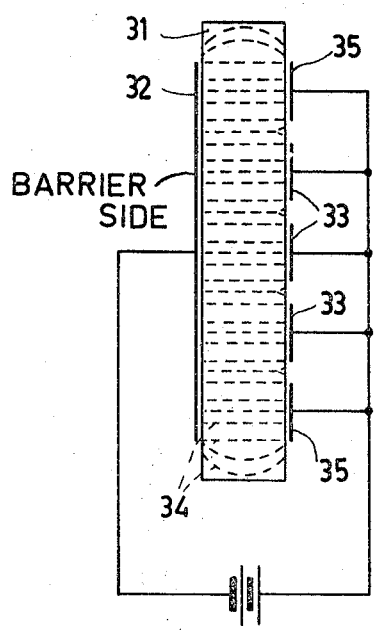
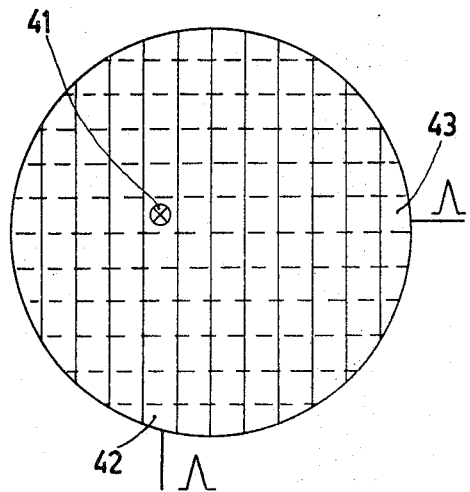
FIG.3   FIG.4
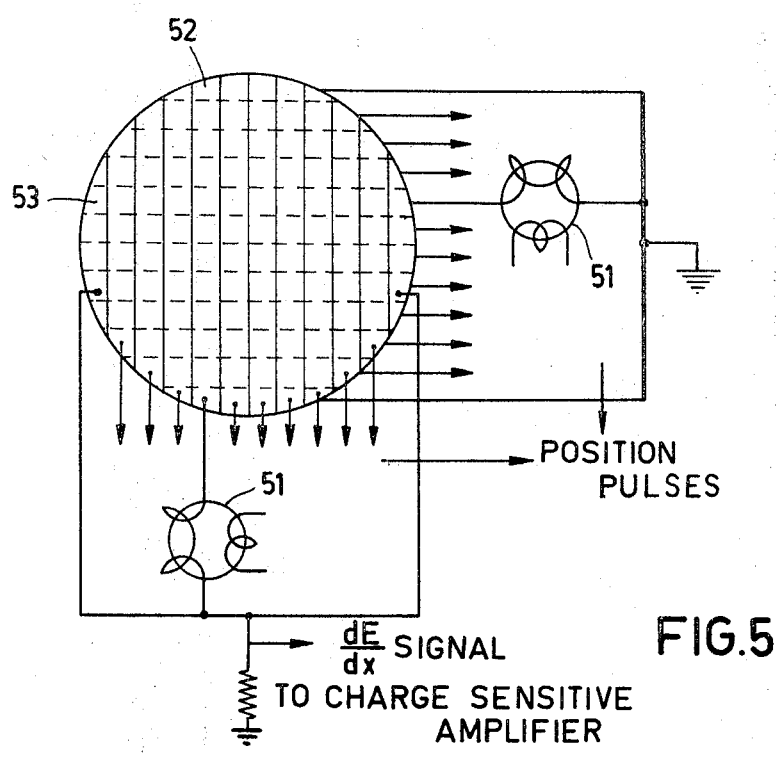
FIG.5

Sept. 15, 1970  D. P. OOSTHOEK ET AL  3,529,161
SEMICONDUCTOR DEVICE FOR DETECTING AND/OR MEASURING RADIATION
Filed Feb. 28, 1967  4 Sheets-Sheet 3

INVENTORS
DIRK PIETER OOSTHOEK
ERWIN KOK
BY
AGENT

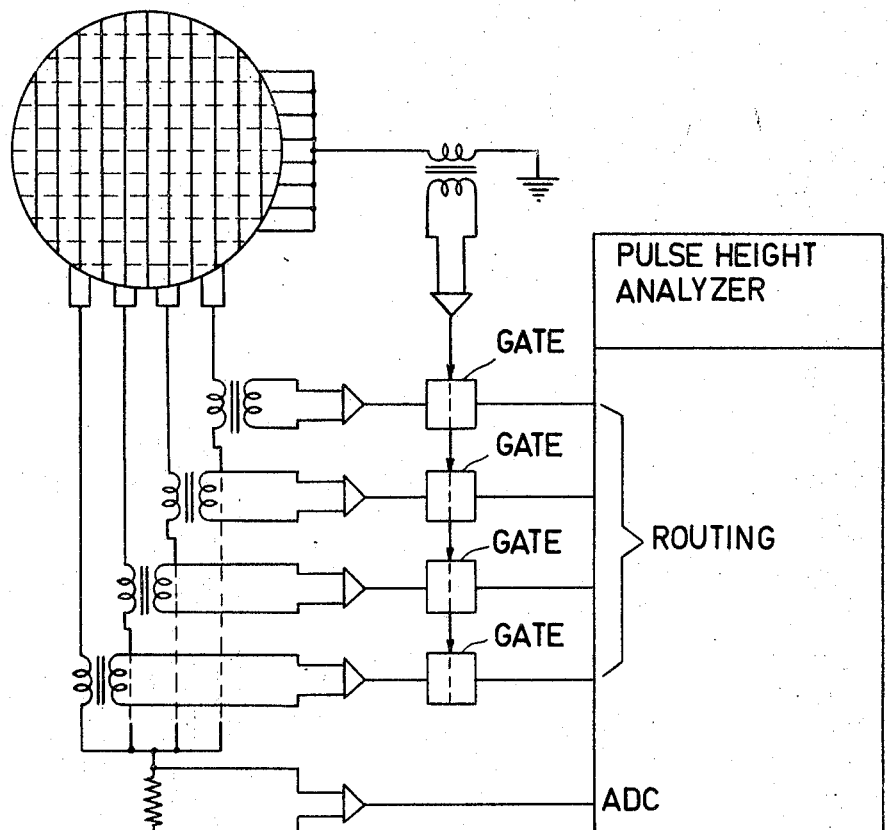
FIG.9
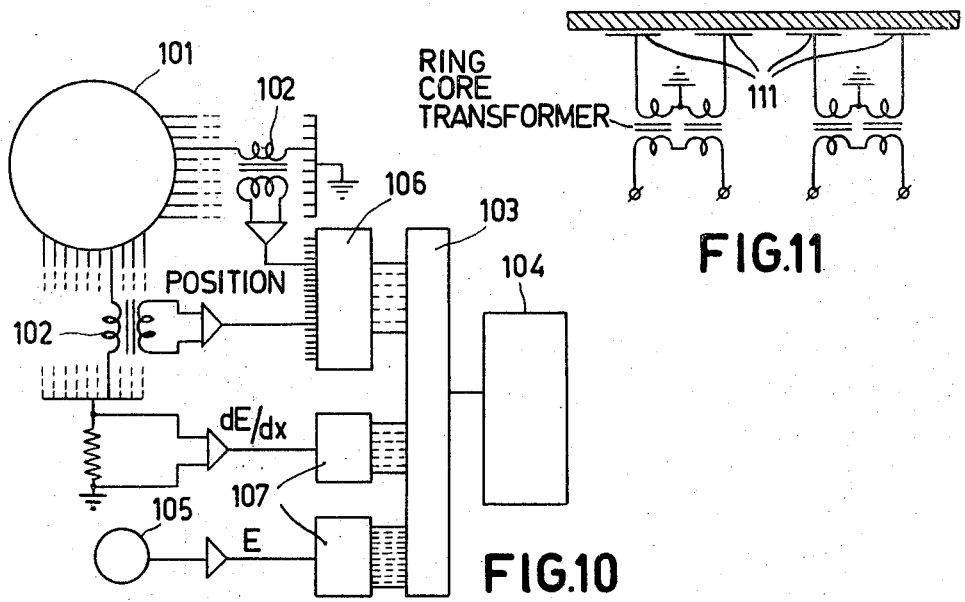
FIG.10
FIG.11
INVENTORS
DIRK PIETER OOSTHOEK
ERWIN KOK
BY
AGENT United States Patent Office 3,529,161
Patented Sept. 15, 1970

3,529,161
SEMICONDUCTOR DEVICE FOR DETECTING
AND/OR MEASURING RADIATION
Dirk Pieter Oosthoek and Erwin Kok, Amsterdam,
Netherlands, assignors, by mesne assignments, to U.S.
Philips Corporation, New York, N.Y., a corporation
of Delaware
Filed Feb. 28, 1967, Ser. No. 619,465
Claims priority, application Netherlands, Mar. 1, 1966,
6602606
Int. Cl. G01t 1/24
U.S. Cl. 250—83.3     11 Claims

ABSTRACT OF THE DISCLOSURE

A detector for energetic particles comprising a single crystal disc of semiconductor material with electrodes on opposite surfaces. Each electrode is subdivided into a plurality of parallel, spaced, strips which cross the strips of the other electrodes forming a so-called checker board counter which allows the precise point where the particle impacts on the disc to be located.

---

The invention relates to a semiconductor device for detecting and/or measuring radiation, particularly radiation of charged particles, said device comprising a single-crystal disc of semiconductor material, one of whose major faces is provided with an electrode of rectifying nature, whereas the other face has an electrode of ohmic nature. Such a device, hereinafter termed a radiation detector, is, in general, intended for connection by its electrodes to such a voltage that the depletion layer formed at the rectifying electrode occupies substantially the whole space between the electrodes, said detector being arranged in the path(s) of the radiation to be detected so that it is incident to the disc approximately at right angles. When the detector is struck, for example, by a particle, the latter will give off a certain amount of energy, while the charge released in the form of electrons and holes can be measured as a pulse in the circuit connected to the electrodes.

A detector of the kind set forth is not capable of indicating the orientation of particles incident to the detector at different places. If it is desired to indicate the orientation of the radiation to be detected, a plurality of detectors of the kind described have to be arranged side by side. Then the orientation of a particle can be assessed by finding out the detector which has given off a signal. Such a device for the detection of radiation comprising a plurality of separate detectors is, however, complicated.

The invention has for its object to provide a simple detector of the kind set forth, which also permits of measuring the orientation of the radiation to be detected.

The invention is based inter alia on the recognition of the fact that simply by subdividing the electrodes of a detector of the kind described above a plurality of detectors can be obtained which have a common semiconductor body, while in operation the electric insulation between these detectors is obtained by means of the depletion layer.

According to the invention, a semiconductor device for detecting and/or measuring radiation of the kind described in the preamble is characterized in that the two major faces of the disc have each a plurality of parallel, strip-shaped relatively insulated electrodes, the strips on one side of the disc crossing the strips on the other side of the disc. At each crossing of the strip-shaped electrodes a detector of the known type described above is formed and in operation these detectors are insulated from each other by applying between the electrodes of these detectors a voltage commonly used for such detectors so that a depletion layer is formed, which occupies approximately the whole space between the electrodes, the electrodes of ohmic nature being thus insulated from each other. The electrodes of rectifying nature are insulated from each other by their very nature. The device according to the invention is capable of registering at which place, for example, a particle strikes the disc, since the pulse produced at the impact appears only in the strip-shaped electrodes crossing each other at the point of impact.

The semiconductor disc may consist of n-type silicon, the rectifying electrodes may consist of gold forming a junction of the Schottky type with the disc and the ohmic electrodes may consist of aluminum aluminium deposited on the disc.

The invention furthermore relates to a circuit arrangement comprising a semiconductor device for detecting and/or measuring radiation, which arrangement is characterized in that between the electrodes of rectifying nature and the electrodes of ohmic nature a voltage is applied so that the resultant depletion layer occupies substantially the whole space between the electrodes.

The invention will now be described more fully with reference to embodiments shown in the drawing.

FIG. 3 shows diagrammatically a sectional view of a detector according to the invention and an electric circuit to be connected thereto.

FIG. 4 shows diagrammatically a plan view of a detector according to the invention.

FIG. 5 shows diagrammatically the principle of a read-out system to be connected to a detector according to the invention.

Figure 7:
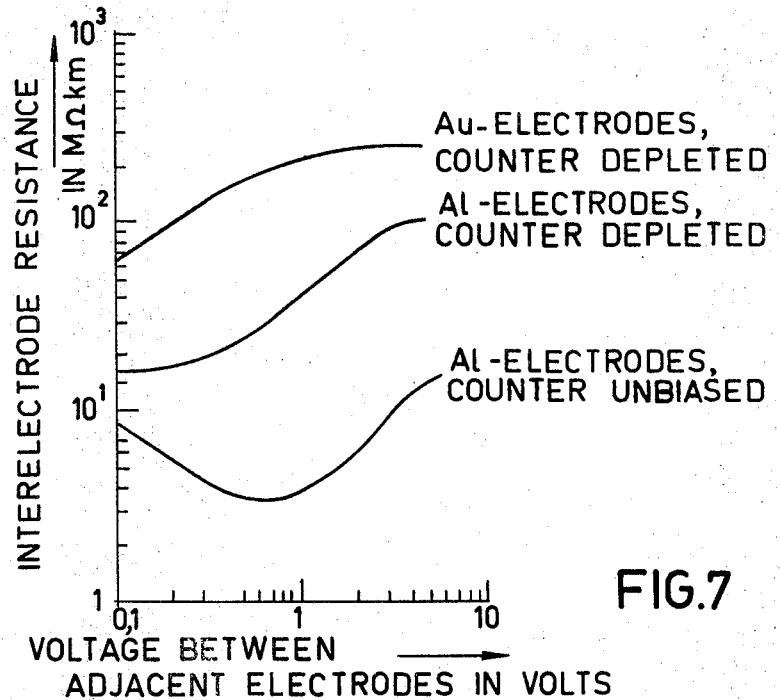

FIG. 7, for a typical case, gives the interelectrode resistances per cm. gap length as a function of the voltage between adjacent strips of a detector according to the invention.

Figure 8:
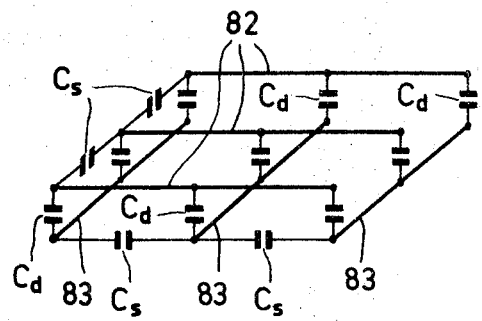

FIG. 8 shows a schematic diagram of the network of capacitances between the electrodes of a detector according to the invention.

FIG. 9 shows a balanced read-out system to be connected to a detector according to the invention.

FIG. 10 is a simplified block diagram of the electronic read-out equipment of a telescope containing a $(dE/dx)$-detector according to the invention and an (E)-detector.

FIG. 11 shows a sectional view of a detector according to the invention to be employed as a 4-position detector.

Figure 1:
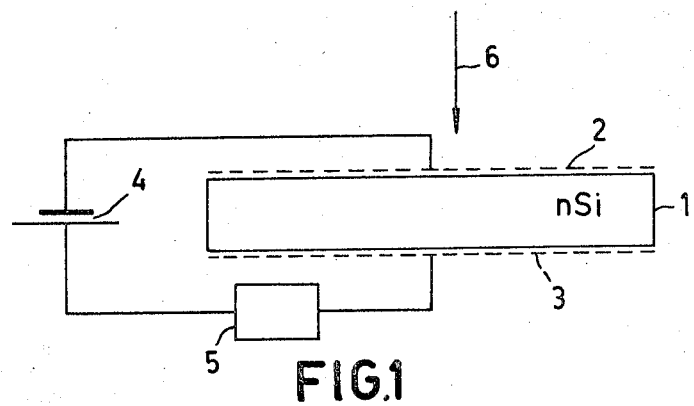
FIG. 1 shows diagrammatically a sectional view of a particle counter of known type and an electric circuit to be connected thereto.

The particle detector shown in FIG. 1 comprises a single crystal disc, preferably of a semiconductor material of diamond structure, for example germanium and silicon. It should be noted that the term "diamond structure" in this case has to denote not only crystals having only one type of atom, but also crystals having two types of atoms, as for example in the zinc blende structure or more than two atom types. In the present case the disc 1 consists of n-type silicon of a resistivity of the order of 5000 ohm cm. The disc may have a diameter of about 25 mm. and a thickness of, for example 25 to 300 $\mu$. To the upper side an electrode 2 of pure gold is applied by vapour deposition; this electrode is shown in broken lines; the lower side is provided by vapour deposition with an electrode 3 of pure aluminum, also indicated in broken lines. The gold electrode on the very high-ohmic silicon forms a Schottky junction, while the electrode 3 is of the ohmic type. To these electrodes is connected a circuit including a voltage source 4, the voltage of which is adjusted so that the depletion layer at the electrode 2 occupies substantially the whole space between the electrodes. The circuit furthermore includes a measuring device 5 for counting and/or analysing the pulses produced at the incidence of charged particles, for example α particles, deuterons and protons, which are incident to the electrode 2 in the direction of the arrow 6 and penetrate into the disc 1.

Figure 2:
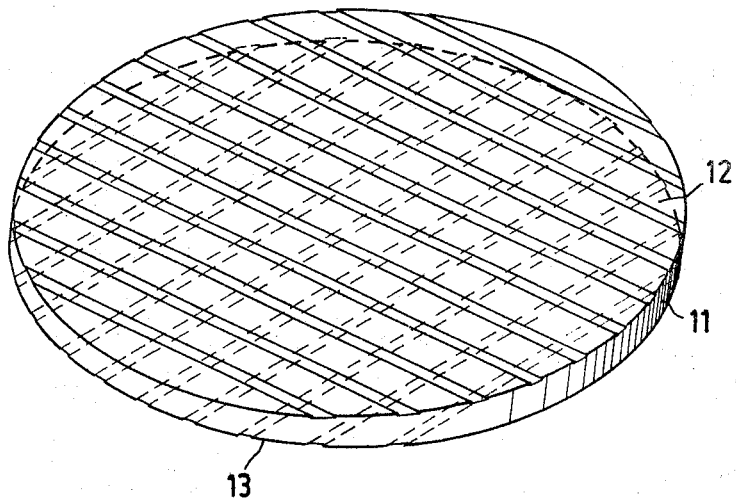
FIG. 2 is perspective view of a particle detector according to the invention.

According to the invention, the electrodes 2 and 3 are subdivided into a plurality of parallel strips 12 and 13 respectively (see FIG. 2), the strips 12 crossing the strips 13. The semiconductor disc in FIG. 2 is designated by 11. The strips 12 and 13 are insulated from each other by non-covered paths.

The strip-shaped electrodes may be applied by vapour deposition and during the vapour-deposition process a grating of parallel metal wires is disposed on the disc, while the source of metal to be evaporated is formed by a wire extending parallel to the wires of the grating and stretched above them at a given distance.

The strips 12 are of gold and the strips 13 are of aluminum.

Between the strips 12 and 13 a voltage can be applied so that the depletion layer occupies approximately the whole space between the electrodes. The strips of the upper and lower sides may be connected to a measuring device (not shown).

Apart from supplying other information the measuring device is capable of registering at which place a particle strikes the disc, since the pulse produced at this impact appears only in those strips 12 and 13 which cross each other at the point of impact.

In the embodiment described above any semiconductor crystal of any crystal orientation may be used. However, especially in cases where the energy of the incident radiation is not fully absorbed in the detector the crystal orientation is of importance. For example in reaction experiments with accelerated particles it is often important to determine the quantities E, MZ² and Θ of the charged reaction products, where E is the energy, Z the atomic number, M the mass and Θ is the scattering angle. These parameters can be measured with a $(dE/dx \approx E)$ telescope system in a goniometer. Usually a collimator is placed in front of the telescope system in order to define the solid angle. A characteristic of this set up is that the angular accuracy of the measurement depends on the solid angle of the collimator opening as seen from the target; consequently a high angular accuracy requires a small solid angle. Reducing the solid angle, however, lowers the counting rate, resulting in a reduced ratio of signal to background counting rate, and tends to increase slit scattering, unless the linear dimensions of the scattering chamber including the collimators are scaled up. These effects are clearly demonstrated in the literature by the fact that the experimental accuracy of angular distributionsis poor for backward angles, where the cross-section tend to be low. Even more striking is the scarcity of particle-particle angular correlation measurements, which demand large solid angles in direct contradiction to the requirement of good angular resolution. In order to increase the solid angle and to avoid slit scattering while preserving the angular accuracy, a $dE/dx$ counter is needed which provides information about the place of incidence of the particles. A possible solution is the creation of a resistive layer with at least three contacts on one side of the counter. The ratio of the pulse heights from these contacts determines the place of incidence. A better method of improve the accuracy of the position measurement while preserving the energy resolution is to fabricate a number of small separated $dE/dx$ counters on the same semiconductor slice. Here the difficulty lies in the wire connections which should not be seen by the particles. To overcome these difficulties we used a $dE/dx$ detector with subdivided front and back electrodes. By way of example we will describe now as a second embodiment of our invention such a $(dE/dx)$-detector.

If a semiconductor disc, containing a junction on one side and an electrical contact on the other side, is biased highly enough to extend the depletion layer from the junction to the back contact, a splitting up of the back contact gives a corresponding geometric division of the internal electrical fields.

This is diagrammatically shown in FIG. 3 in which 32 is a contact on the barrier side of a semiconductor disc 31. The ohmic back contacts are denoted with 33 and the internal electrical field geometry is indicated by broken lines 34. In principle ionization charges in the electrical field of one contact 32, 33 cause only a current pulse through this contact, giving the opportunity to localize the place of generation of the charges from the contact position. Following this principle we constructed an electrode geometry as is shown in FIG. 2. The electrodes are subdivided on the front and back in parallel strips 12, 13 in such a way, that the directions of the strips 12 on the front and the strips 13 on the back are perpendicular. When the counter is biased so that it is completely depleted, an incoming particle 41, shown in FIG. 4, will give a current pulse through the leads of one of the front strips 42 and one of the back strips 43; the place of incidence is located in that part of the counter where both perpendicular strips overlap each other. Since the strips extend to the nonsensitive edges of the detector, scattering from wires or loss of useful surface may be avoided.

In FIG. 5 the principle of the read-out system is given. The incidence position is indicated by pulses picked up by small ringcore transformers 51 in the electrical connections to the electrode strips. The $dE/dx$ signal is presented to a charge sensitive amplifier which has a time constant large compared with those of the transformer inputs. More details of the read-out system are given in a following section.

Collimation is obtained by electrical means in the counter itself. To obtain a well defined solid angle the strip patterns have to be laid out with micron precision. The gaps between adjacent strips should be narrow in order to avoid slow pulses caused by the resistance of surface channels through which electrons and holes are collected. Subsequently also the area of the squares at the outer edge should be biased independently. In this way the outer electrodes may serve as guard field electrodes indicated by 35 in FIG. 3. This can be realized by extending the strip pattern to the edge of the counter giving there a number of sensitive fields which are biased, but are not used for position indication. With these precautions it is possible to use small checker board fields, so that short distances between target and detector are possible. Also the detector dimensions can be smaller which gives a better energy resolution.

The counter we constructed has 12 strips on both sides giving, within a diameter of 16 mm., 88 useful detector squares. With this counter situated at a distance of 8 cm. from the target an angular distribution can be measured with an accuracy of about 1 degree.

The construction of the checker board counter is derived from a $dE/dx$ counter consisting of a disc of n-type silicon which has on one side a gold evaporated surface barrier and on the other side an aluminum evaporated back contact. The electrode strips are obtained by evaporating the bold and aluminum layers through a wire mask. The wires have a diameter of 100 micron. By using a line-shaped evaporating source, positioned parallel to the mask wires, it was possible to reduce parallax effects in the evaporation process; it was thus possible to obtain a reproducible and narrow interelectrode gap. The evaporating masks are made with a precision better than 10 micron in order to realize a reproducible detector with well defined areas for the different checker board fields. If the checker board fields are made equal there are, because of the deviation of the spherical geometry, slight differences in solid angle between fields in the center compared with fields near the edge of the counter. However, by making the electrode strips in the outermost position slightly wider compared with those near the center a first order correction was made.

The n-type silicon discs with diamond crystal structure have a special crystal orientation. As already is pointed out by Wegner, Erginsoy and Gibson, IEEE Trans Nuclear Science NS–12, February 1965, pages 240–246 differences in the energies given off by incident particles may occur since these energies are dependent on particle track orientation. To decrease these differences Wegner et al. proposed to cut the discs perpendicular to a direction turned through about 20° with respect to the (100)-axis towards the direction of the (110)-axis and through about 8° with respect to the (110)-axis towards the (111)-axis They expected that with this direction channeling of the particles through the disc which channeling effects which are responsible for the energy differences mentioned above, can be avoided. We prefer on another cut, which is proposed by one us, D. P. Oosthaek and two colleagues J. Hornstra and R. van Dantzig and which crystal orientation in connection with detectors is the subject matter of a copending application Ser. No. 619,466, filed Feb. 28, 1967. Our discs are cut perpendicular to an irrational direction which deviates by an angle of 1° from the (432)-direction of the single crystal towards the (111)-direction, the maximum deviation of the normal on the disc around said irrational direction being 5°. This cut was chosen in preference to the one proposed by Wegner et al. because the (432) cut makes a smaller angle with the monocrystal axis (111) along which the crystal is grown; this results in less waste of silicon with circularly shaped detectors, whereas the channeling effects are expected to be comparably small.

Figure 6B:
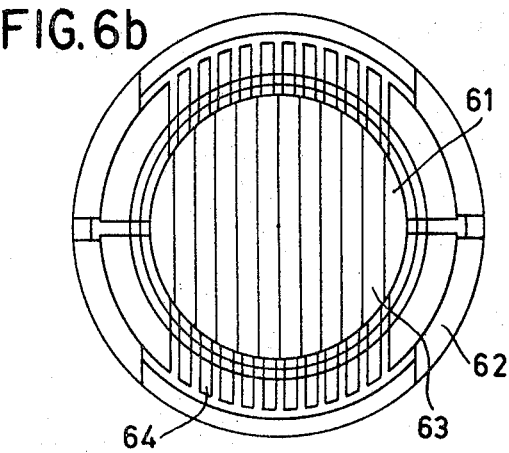
FIGS. 6a and 6b show a cross-section and a plan view of a checker board counter according to the invention.
Figure 6A:
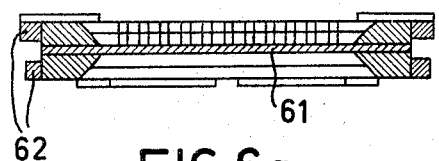

FIG. 6 shows a cross section and a plan view of the checker board counter of the type we are making routinely. The thin silicon slice 61 is strengthened by placing it between two glass rings 62 of which the thermal expansion coefficient is closely matched to that of silicon. Cooling of the detector to the temperature of liquid air appears to be possible. Although this feature is not important for a $dE/dx$ counter, the cooling of a complete telescope to −30° C. may be desirable to improve the resolution of the E-counter (usually a thick Li doped silicon p-i-n detector). At room temperature the f.w.h.m. of the noise spectrum of these checker board counters (disc thickness 200 micron) with the electrodes connected in parallel is on the average 30 kev.; the f.w.h.m. of a 5 mev. alpha particle spectrum is about 40 kev. The electrode strips 63 extend to evaporated contacts 64 on the glass rings 62. The counter is connected by direct soldering on these contacts.

An important problem to discuss is the crosstalk between the electrodes which is determined by the resistances and capacitances between electrodes and by external impedances. The interelectrode resistances per cm. gap length as a function of the voltage between adjacent strips are given for a typical case in FIG. 7. The total electrode capacitance of the unconnected detector can be derived from the capacitance between one square and the square directly opposite ($C_d$) and the capacitance between two adjacent strips on one side of the detector ($C_s$). FIG. 8 shows a schematic diagram of the network of these capacitances for a simplified case (3 front electrodes 82 and 3 back electrodes 83). $C_s$ is 1 pf./cm. in our case and $C_d$ is proportional to the area of one square and inversely proportional to the disc thickness. $C_d$ is 1 pf. for a 200 micron thick detector and a square of 1.37 ×1.37 mm.². The contribution to the interelectrode capacitance between any two strips on one side of the detector due to the $C_d$'s with all crossing strips on the other side, is 3.5 pf./cm. This crosstalk path would be short circuited if the crossing strips were grounded. It is therefore advantageous to keep the input impedance of the readout electronics as low as possible, e.g. by using current sensitive amplifiers. This also reduces crosstalk due to the other interelectrode impedances. Another possibility to reduce the crosstalk via the capacitance $C_d$ is the use of a balanced read-out system as shown in FIG. 9.

The position pulses are detected by fast amplifiers (gain about 1000). The output pulse width is about 25 nsec. Pulses of 300 kev. can be detected above the noise. A charge sensitive amplifier is used for the $dE/dx$ signal; the clipping time should be about 1 μsec. to obtain a good resolution.

In FIG. 10 a simplified block diagram is given of the electronic read-out equipment of a telescope containing a checker board detector 101 and an E detector 105. The position pulses are taken from the transformers 102, coded by a coder 106 and supplied to a binary register 103. The manner of coding is largely determined by the amount of information which the experimenter wants to retain. The original information allows recognition of simultaneous events occurring in different squares, but binary coding of the square number is in error if such an event occurs. The $dE/dx$ and E signals are digited by means of analog to digital converters 107, the resulting numbers also being put into binary registers. A small data processor 104 may accept the content of the 3 registers and handle the data in a variety of possible ways.

Actually the balanced read-out system of FIG. 9 which has the merit of reducing crosstalk allows an extra trick to be played. Only one pulse amplifier is then used for every two electrode strips. To distinguish between the two strips the secondaries of all pulse transformers are connected in such a way that one strip of each pair (e.g. the right-hand one) gives a positive pulse and the other a negative pulse on the input of one common "left-right" binary stage, which is sensitive for only one polarity. Each pair of strips is connected to a binary stage which is sensitive at the input to both polarities.

A pulse height analyzer can be used if the checker board counter is employed as a 4-position detector (FIG. 11). As appears from FIG. 11 a number of strips 111 are connected in parallel. By using the routing of the pulse height analyzer the energy spectra of the four areas are accumulated in separate groups of the memory.

If only position indication and counting is needed the read-out system of the checker board counter can be simple, viz. the position pulses are supplied to a 7-bits binary coder, which is connected to the address register of a pulse height analyzer.

It will be obvious that a detector according to the invention might have a number of other possible applications as, for example, checking the homogeneity of alpha sources, measuring the angular distribution of fission products, in tripartite fission studies and apart from corpuscular radiation also electro-magnetic radiation can be detected, in which case a detector according to the invention may be employed, for example, for "reading" characters.

What is claimed is:

1. A semiconductor device for detecting charged particle raditaion comprising a single crystal disc of semiconductor material having opposed major surfaces, means forming a rectifying electrode on one major surface, and means forming an ohmic electrode on the opposite major surface, each of said electrodes comprising a plurality of mutually-insulated, strip-shaped electrode portions, the strip-shaped electrode portions of one electrode crossing over the strip-shaped electrode portions of the other electrode.

2. A semiconductor device as set forth in claim 1 wherein the disc is of silicon of n-type conductivity.

3. A semiconductor device as set forth in claim 2 wherein the rectifying electrode is of gold forming a Schottky type junction with the disc, and the ohmic electrode is of aluminum.

4. A semiconductor device as set forth in claim 1 wherein the strip-shaped electrode portions of each electrode are parallel to another, and further including means for establishing separate electrical connections to each of the electrode portions of each of the ohmic and rectifying electrodes.

5. Radiation detection apparatus comprising a semiconductor device; said device comprising a single crystal disc of semiconductor material having opposed major surfaces, means forming a rectifying electrode on one major surface, means forming an ohmic electrode on the opposite major surface, each of said electrodes comprising a plurality of mutualy-insulated, parallel, strip-shaped electrode portions, the strip-shaped electrode portions of one electrode crossing over the strip-shaped electrode portions of the other electrode; and means for applying across the ohmic and rectifying electrode portions a voltage at which the resultant depletion layer within the disc occupies approximately the whole space between the electrodes.

6. Radiation detection apparatus as set forth in claim 5 wherein separate output means are connected to each of substantially all of the crossing strip-shaped electrode portions.

7. Radiation detection apparatus as set forth in claim 6 wherein the outermost strip-shaped electrode portions serve as guard electrodes and include means for having a voltage applied but no output means for determining particle impact position.

8. Radiation detection apparatus as set forth in claim 7 wherein the guard electrode portions are slightly wider than the other electrode portions.

9. Radiation detection apparatus as set forth in claim 5 and including means connected to the strip-shaped electrode portions for deriving electrical signals from those crossing strips closest to the impact point of incident radiation, and means connected to the last-named means for converting said signals into a form for registering information about the incident radiation.

10. Radiation detection apparatus as set forth in claim 9 including balancing means connected to each pair of adjacent strips on one side of the disc to produce an output signal corresponding only to the voltage difference occurring between the strip pair upon the incidence of radiation.

11. Radiation detection apparatus as set forth in claim 10 wherein the balancing means comprises a transformer having an center-tapped primary connected across the strip pair, and means connected to the center tap for maintaining it at a fixed potential.

References Cited

UNITED STATES PATENTS

| | | | |
|---|---|---|---|
| 3,207,902 | 9/1965 | Sandborg | 250—83.1 |
| 3,415,992 | 12/1968 | Webb | 250—83.3 |

RALPH G.; NILSON, Primary Examiner

D. L. WILLIS, Assistant Examiner

U.S. Cl. X.R.

250—83